T. W. PORTER.
Sleigh.

No. 75,971.

2 Sheets—Sheet 1.

Patented March 24, 1868.

Witnesses
H. T. Whitman
H. K. Porter.

Inventor
T. W. Porter.

T. W. PORTER.
Sleigh.
2 Sheets—Sheet 2.
No. 75,971.
Patented March 24, 1868.
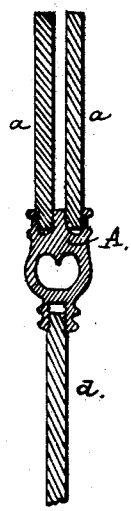
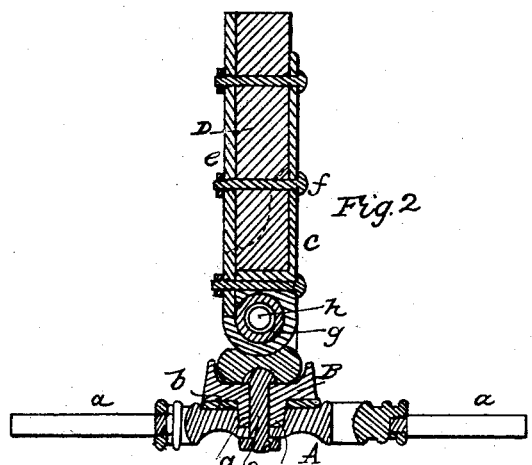
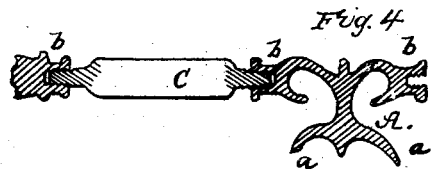
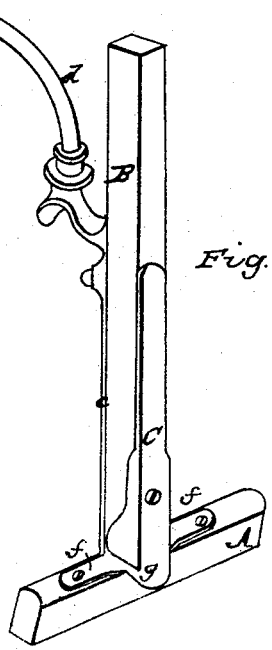
WITNESSES
INVENTOR.
T. W. Porter.

United States Patent Office.

T. W. PORTER, OF BOSTON, MASSACHUSETTS, ASSIGNOR TO HIMSELF AND CHARLES L. MARSTON.

*Letters Patent No. 75,971, dated March 24, 1868.*

IMPROVEMENT IN SLEIGHS.

*The Schedule referred to in these Letters Patent and making part of the same.*

TO ALL WHOM IT MAY CONCERN:

Be it known that I, T. W. PORTER, of Boston, in the county of Suffolk, and State of Massachusetts, have invented a new and useful Improvement in Sleighs; and I do hereby declare that the following is a full, clear, and exact description of the construction and operation of the same, reference being had to the accompanying drawings, making a part of this specification, in which—

Figure 1:
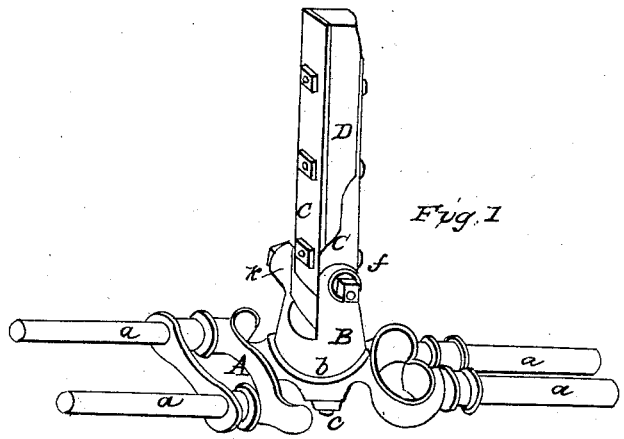
Figure 6:
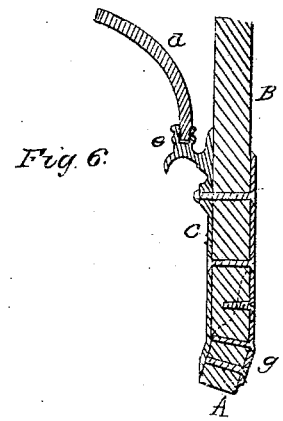
Figure 3:
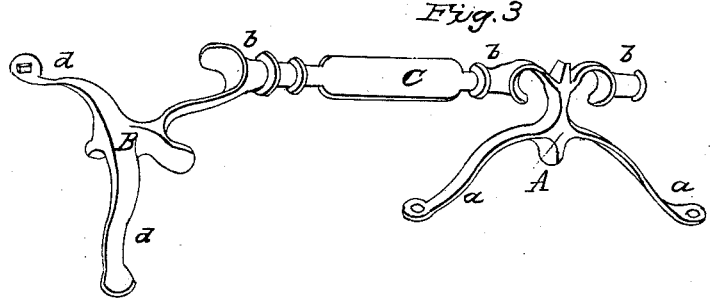
Figure 7:
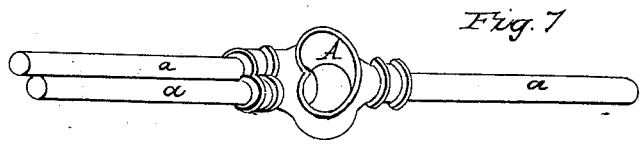
Figure 9:
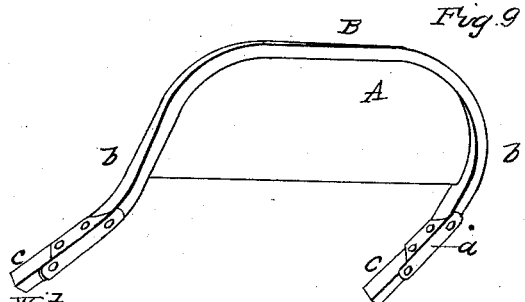

Figure 1 is a perspective view of a shaft-hanger and tip, and
Figure 2 is a longitudinal vertical section of the same.
Figure 3 is a perspective view of an improved foot-rail, and
Figure 4 is a longitudinal vertical section of the same.
Figure 5 is a perspective view of a sleigh-standard and runner-coupling, and combined brace and strap.
Figure 6 is a vertical section of the same.
Figure 7 is a perspective view of a brace-centre, and
Figure 8 is a horizontal section of the same.
Figure 9 is a perspective view of a sleigh-dasher, and
Figure 10 is a detached view of a runner-coupling used with the dasher.

Similar letters of reference indicate corresponding parts in the several figures of the same device.

The nature of my invention consists in a shaft-hanger, constructed with a malleable-iron centre, combined with wrought-iron stays, the socket for the shaft being formed upon the centre or separately, in which case a circular incline may be used to adjust the parts relatively to each other; also, in a peculiarly-formed tip, which is attached to the rear end of the shaft, and fits to the hanger-socket; also, in forming the foot-rail with malleable-iron brackets, into which separate pieces of the rail are inserted; and also in a peculiarly-constructed malleable-iron coupling for connecting the standard to the runner, and in combining wrought-iron braces with malleable-iron terminations, to attach to the standards or runners; also, in uniting three or more stays or braces of wrought iron by means of malleable-iron centres, united to the stays by male and female screws, or other means; and also in a dasher-rail, which encloses the entire top and ends of the dash-board, and joins the runners below the dasher, this rail forming the right and left bends of the common dash-rail, as well as the usual forward bends of the tops of the runners, which this rail is a substitute for when bent in this manner.

In figs. 1 and 2, A represents the malleable-iron centre, and $a\,a\,a\,a$ the wrought-iron stays, which connect with the centre, by male and female screws, as shown in fig. 2. These stays lead to the parts of the sleigh to which the hanger is attached. B is the shaft-socket, and $b$ is an incline disk, which is placed between the centre, A, and the socket B, as shown in fig. 2, while the screw-bolt $c$, passing through socket B, disk $b$, and centre A, holds them firmly together. $d$ is a hollow pivot, formed on the socket B, and which fits into a corresponding recess in centre A. This hollow pivot relieves bolt $c$ of most of the drawing strain, and, by forming socket B to revolve on centre, A, much of the labor of fitting the hangers is saved, as the holes can at once be brought in line, while the incline $b$ is used to compensate any lateral inclination of the centres. C is a tip, which receives the rear end of shaft D in a recess, as shown, while the usual strap, $e$, which extends down the under or concave side of the shaft, also fits into a recess in tip C, and bolts $f\,f\,f$ pass through the tip, the shaft, and strap, securing them firmly together. The lower bolt, $f$, passing through the tip just below the shaft-recess, serves to more fully unite the shaft and tip. To secure the tip C to the socket B, an iron tube, $g$, passes through the ears, $k\,k$, of the socket, and also through a hole in the tip, while a screw-bolt, $h$, passing through the hole in the tube, secures the latter in place; and a rubber cushion, $i$, placed in the socket B, bears against the end of the tip, preventing all noise or rattling. The socket B, with its ears $k\,k$, may be formed as a part of the centre A, if in any case it is desirable.

In figs. 3 and 4, A represents a central bracket, and B an end bracket for a foot-rail. These brackets are formed with legs, $a\,a$, by which to connect them to the sills of the vehicle, and also with socketed arms $b\,b$, into which the foot-rail C is secured, by male and female screws, as shown.

The brackets are formed of malleable iron, while the foot-bar is formed of wrought iron, whereby the usual difficult part of the forging is avoided, while, by varying the length of the foot-bar, all widths of vehicles are readily fitted.

In figs. 5 and 6, A represents a section of a sleigh-sill or runner, and B a standard, while C is a coupling, uniting the two. c is a brace-plate or foot, which connects with the brace d, by male and female screws, as shown.

The foot c is formed of malleable iron, of such length and form as the position may require, and the wrought-iron brace may be inserted as shown, or by riveting, or by casting the malleable iron thereon. By thus combining the two parts, time and expense are saved, and strength and grace of form secured.

The coupling C is formed with a socket, for the reception of the standard, while two lateral ears, $ff$, extend along the top of the runner, and are secured by rivets passing down through the runner. The ear $g$ extends down the outside of the runner, and a rivet passes through this ear, the runner, and the lower end of the plate c. Thus the rivets, passing through the runner each way, prevent it from splitting.

In figs. 7 and 8, A represents a malleable-iron centre, having three sockets—two at one end, and one at the other. In these sockets are secured, by male and female screws, the wrought-iron rods $a\ a\ a$, as shown. This method of connecting three or more rods, by a malleable-iron centre, saves largely in the cost of forging, and allows a greater variety of forms.

In figs. 9 and 10, A represents the dash-board of a sleigh, and B the rail, which is attached to the runners by the metallic coupling $a$, the rail and runner meeting at $d$. In the manner heretofore employed, the runners $c\ c$ continued up and joined the rail at the lines $b\ b$, the ends of the rail being curved inward to nearly a right angle with the front of the dasher, and the runners having the usual forward curve. The groove cut for the dasher-board leaving only a right-angled section of wood, the joining was difficult and weak. Besides, in case of breaking the dasher and top of the runners, rejoining was attended with many difficulties; whereas, by forming the dash-rail B to extend below the dasher, the joining is made where the entire strength of the wood remains, and in a nearly straight part of the runner, and, in case of repairs, the joint is ready made for the reception of another dasher-rail.

Having thus described my invention, what I claim as new, and desire to secure by Letters Patent, is—

1. The shaft-hanger, constructed with wrought-iron stays and malleable-iron centre, substantially as described and shown in figs. 1 and 2.

2. The tip-socket B, formed separate from the centre A, and to revolve thereon, substantially as and for the purposes specified.

3. The hollow pivot $d$, formed upon socket B, substantially as and for the purposes specified.

4. The incline disk $b$, in combination with the centre A and socket B, substantially as and for the purposes specified.

5. The tip C, formed with a recess for the shaft D, and to receive the wrought-iron strap $e$, at the lower bolt-hole, substantially in manner as described and shown.

6. The foot-rail, constructed with brackets, combined with insertable foot-bars, substantially in manner as and for the purposes specified.

7. The coupling C, when constructed with the recess for standard B, the ears $ff$, and the lip $g$, substantially as described and shown.

8. Combining, with the wrought-iron stay or brace $d$, the socketed malleable-iron strap or foot C, substantially as described and shown in figs. 5 and 6.

9. The dash-rail B, formed to extend below the dash-board A, substantially as described, and for the purposes specified.

T. W. PORTER.

Witnesses:
   H. K. PORTER,
   J. REED.